United States Patent
Cianflone et al.

(10) Patent No.: US 9,133,792 B2
(45) Date of Patent: Sep. 15, 2015

(54) UNIT FOR ESTIMATING THE ROTATIONAL SPEED OF A TURBOCHARGER AND SYSTEM AND METHOD FOR CONTROLLING AN INTERNAL COMBUSTION ENGINE WITH A TURBOCHARGER

(75) Inventors: Francesco Cianflone, Turin (IT);
Gerhard Landsmann, Roedern (DE);
Andreas Sidorow, Darmstadt (DE);
Christopher Eck, Darmstadt (DE); Rolf Isermann, Darmstadt (DE); Ulrich Konigorski, Darmstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 489 days.

(21) Appl. No.: 13/588,182

(22) Filed: Aug. 17, 2012

(65) Prior Publication Data

US 2013/0042609 A1 Feb. 21, 2013

(30) Foreign Application Priority Data

Aug. 17, 2011 (GB) .................................. 1114162.9

(51) Int. Cl.
| | |
|---|---|
| B60T 7/12 | (2006.01) |
| F02M 25/07 | (2006.01) |
| F02D 41/00 | (2006.01) |
| F02D 41/14 | (2006.01) |
| F02B 37/18 | (2006.01) |
| F02D 23/00 | (2006.01) |

(52) U.S. Cl.
CPC ............ *F02M 25/0707* (2013.01); *F02B 37/18* (2013.01); *F02D 23/00* (2013.01); *F02D 41/0007* (2013.01); *F02D 41/0062* (2013.01); *F02D 41/1446* (2013.01); *F02D 41/1448* (2013.01); *F02M 25/0709* (2013.01); *F02D 2041/0067* (2013.01); *F02D 2041/1433* (2013.01); *F02D 2200/0402* (2013.01); *F02D 2200/0406* (2013.01); *F02D 2200/0414* (2013.01); *Y02T 10/144* (2013.01); *Y02T 10/47* (2013.01)

(58) Field of Classification Search
CPC ....................... F02D 41/0072; F02M 25/0754
USPC ......... 701/103, 108, 114; 123/568.21, 568.26
See application file for complete search history.

(56) References Cited

U.S. PATENT DOCUMENTS

| | | |
|---|---|---|
| 6,672,060 B1 | 1/2004 | Buckland et al. |
| 2001/0032466 A1* | 10/2001 | Waszkiewicz et al. ......... 60/602 |

(Continued)

FOREIGN PATENT DOCUMENTS

| | | |
|---|---|---|
| EP | 2339153 A1 | 6/2011 |
| JP | 2002266690 A | 9/2002 |

(Continued)

*Primary Examiner* — John Kwon
(74) *Attorney, Agent, or Firm* — Ingrassia Fisher & Lorenz PC (57) ABSTRACT

A unit for estimating a rotational speed of a turbocharger is provided. The unit includes a microprocessor comprising input ports configured for receiving measurement signals from an exhaust gas flow control system of an internal combustion engine and an output port for outputting a signal indicative of the rotational speed of the turbocharger. The input ports are adapted to receive a first set of measurement signals and a second set of measurement signals. A microprocessor is configured to calculate an estimated rotational speed of the turbocharger using a turbocharger model, based on the first set of measurement signals and the second set of measurement signals. Rhe second set of measurement signals include signals indicative of a pressure difference across a turbine of the turbocharger.

18 Claims, 3 Drawing Sheets

(56) References Cited

U.S. PATENT DOCUMENTS

| | | |
|---|---|---|
| 2006/0005540 A1 | 1/2006 | Baize et al. |
| 2007/0179763 A1 | 8/2007 | Perchanok et al. |
| 2007/0266706 A1 * | 11/2007 | Gehrke et al. ............... 60/605.1 |
| 2009/0222190 A1 | 9/2009 | Andreae et al. |

| | | |
|---|---|---|
| 2011/0213539 A1 | 9/2011 | Eiraku |

FOREIGN PATENT DOCUMENTS

| | | |
|---|---|---|
| JP | 2004257315 A | 9/2004 |
| JP | 2007154809 A | 6/2007 |

* cited by examiner

UNIT FOR ESTIMATING THE ROTATIONAL SPEED OF A TURBOCHARGER AND SYSTEM AND METHOD FOR CONTROLLING AN INTERNAL COMBUSTION ENGINE WITH A TURBOCHARGER

CROSS-REFERENCE TO RELATED APPLICATION

This application claims priority to British Patent Application No. 1114162.9, filed Aug. 17, 2011, which is incorporated herein by reference in its entirety.

TECHNICAL FIELD

The technical field relates generally to internal combustion engines and, more particularly, to a unit for estimating the rotational speed of a turbocharger and a system and method for controlling an internal combustion engine with a turbocharger.

BACKGROUND

One technique for reducing unwanted emissions, such as NOx, from internal combustion engines involves introducing chemically inert gases into the fresh airflow used in the subsequent combustion process. The oxygen concentration in the combustion mixture is reduced, the fuel burns slower, peak combustion temperatures are reduced and, consequently, the production of NOx gases is reduced. One way of introducing chemically inert gases is through the use of a so-called Exhaust Gas Recirculation (EGR) system.

EGR operation may be adjusted to engine operation conditions. In this case, an EGR system may include a valve, commonly referred to as an EGR valve, for the controlled introduction of exhaust gas into the intake manifold. The EGR valve operation modifies the turbocharger speed and swallowing capacity, that is the mass flow rate, of the turbocharger indirectly by changing the exhaust flow through the turbine of the turbocharger.

In addition to an EGR valve, air-handling systems for turbocharged internal combustion engines may include one or more supplemental or alternate air handling control mechanisms for directly modifying the swallowing capacity and speed of the turbocharger. For example, the air handling system may include a wastegate disposed between an inlet and outlet of the turbocharger turbine to selectively route exhaust gas around the turbine and thereby control the swallowing capacity and the speed of the turbocharger. Alternatively or additionally, the system may comprise an exhaust throttle disposed in line with the exhaust conduit either upstream or downstream of the turbocharger turbine to control swallowing capacity and the speed of the turbocharger.

Alternatively, or in addition, the turbocharger may comprise a variable geometry turbine, which is used to control the swallowing capacity of the turbocharger by controlling the geometry of the turbine. This type of turbochargers may be useful, e.g., in lean burn gas engines, where combustion is sensitive to gas quality and air temperature variations.

US 2006/0005540 A1 discloses a system for limiting the rotational speed of a turbocharger to avoid overspeed conditions and damage to the turbocharger. US 2006/0005540 A1 also discloses systems, which do not have a turbocharger rotational speed sensor.

In systems in which a turbocharger rotational speed sensor is not present, the rotational speed of the turbocharger is estimated from other types of signals. A suitably programmed microprocessor may be used to estimate the rotational speed of the turbocharger. The microprocessor may be considered as a virtual turbocharger speed sensor.

Further systems and methods that enable the rotational speed of the turbocharger to be more accurately and reliably estimated are provided. In addition, other objects, desirable features and characteristics will become apparent from the subsequent summary and detailed description, and the appended claims, taken in conjunction with the accompanying drawings and this background.

SUMMARY

A unit for estimating the rotational speed of a turbocharger is provided. The unit comprises a microprocessor comprising input ports for receiving measurement signals from an exhaust gas flow control system of the internal combustion engine and an output port for outputting a signal indicative of a rotational speed of the turbocharger. The input ports are adapted to receive a first set of measurement signals and a second set of measurement signals. The microprocessor is adapted to calculate an estimated rotational speed of the turbocharger using a turbocharger model, based on the first set of measurement signals and the second set of measurement signals. The second set of signals includes signals that are indicative of a pressure difference across a turbine of the turbocharger.

In an embodiment, the unit comprises a microprocessor that is adapted to estimate the rotational speed of the turbocharger from signals indicative of a pressure difference across a turbine of the turbocharger. The microprocessor may be suitably programmed in order to achieve the function of estimating the rotational speed of the turbocharger and act as a virtual turbocharger rotational speed sensor. The speed of the turbocharger may be the speed of rotation of the shaft connecting the turbine and the compressor of the turbocharger.

The estimated rotational speed may be used to control the turbocharger, for example to increase the combustion efficiency of an internal combustion engine. Alternatively, or in addition, the estimated rotational speed of the turbocharger may be used to provide an on-board diagnostic facility and to adjust the calibration of a turbocharger speed sensor.

The speed of rotation of the turbocharger may be adjusted by adjusting the amount of exhaust gas or the exhaust gas flow that is directed to the turbine. Consequently, by measuring the pressure difference across the turbine and using this information to estimate the rotational speed of the turbocharger, the turbocharger rotational speed can be estimated more accurately than a model in which only the pressure at the outlet or at the outlet and the inlet of the compressor is measured.

In an embodiment, the second set of measurement signals are indicative of a pressure upstream of a turbine of the turbocharger, a pressure downstream of the turbine of the turbocharger and a temperature upstream of the turbine of the turbocharger.

The pressure difference across the turbine may be obtained from a comparison of the signals indicative of the pressure upstream and downstream of the turbine. In addition, the temperature upstream of the turbine is taken into consideration when calculating the estimated rotational speed of the turbocharger. Taking the temperature into account can be used to improve the accuracy of the estimation of the rotational speed.

In an embodiment, the first set of measurement signals are indicative of a pressure upstream of a compressor of the turbocharger, a pressure downstream of the compressor of the turbocharger and a temperature upstream of the compressor of the turbocharger. In this embodiment, the difference in the pressure across the compressor is used in addition to the difference in pressure across the turbine to calculate an estimated rotational speed of the turbocharger.

The estimation of the turbocharger rotational speed using models of both the compressor and the turbine has the advantage that a set of physical quantities of the compressor and the turbine can be estimated in addition to the rotational speed of the turbocharger. Examples of these physical quantities are the exhaust mass flow through the turbine, turbine efficiency, turbine power, the air mass flow through the compressor, compressor efficiency, and compressor power. These additional outputs of the turbocharger model may be used for onboard diagnostic facility in addition to estimated turbocharger speed sensor.

The first set of measurement signals may be used to calculate an estimated compressor power, an estimated air mass flow through the compressor and an estimated compressor efficiency.

The second set of measurement signals may be used to calculate an estimated turbine power, an estimated exhaust mass flow through the turbine and an estimated turbine efficiency.

In a further embodiment, the estimated compressor power and the estimated turbine power are used to calculate an estimated rotational speed of the turbocharger.

The first set and the second set of measured signals may be used to calculate the mass flows of the compressor and turbine.

In an embodiment, stationary nonlinear functions are used to calculate the mass flows of the compressor and turbine. The use of stationary nonlinear functions enables a wide operation range to be achieved.

The first set and the second set of measured signals may be used to calculate the compressor power and turbine power using nonlinear isentropic efficiency models. The use of nonlinear isentropic efficiency models leads to an increase in the accuracy with respect to the usage of a single mean value of the isentropic efficiency.

In a further embodiment, the heat transfer from the turbine to the compressor is calculated and used in the model to estimate the rotational speed of the turbocharger. The model may also be parameterized using engine test bench measurements.

The turbocharger speed is calculated using a semi-physical model of the turbocharger, for example a variable geometry turbocharger.

The calculated estimated speed can be used to improve fault diagnosis and control of the engine using the output of the unit as a virtual turbocharger speed sensor. This may be useful for on-board diagnosis of faults, for example, the detection of emission relevant faults and/or faults in the intake and exhaust path of the engine.

The estimated rotational speed of turbocharger may be used to check the calibration of a turbocharger sensor. In this embodiment, the unit further comprises an input port for receiving a signal indicative of the measured rotational speed of the turbocharger and the microprocessor is further adapted to compare the estimated rotational speed of the turbocharger with the measured rotational speed of the turbocharger and to adjust a calibration of the signal indicative of the measured rotational speed of the turbocharger based on the estimated rotational speed of the turbocharger. The unit according to this embodiment may be used to correct drift in the calibration of the turbocharger sensor and provide an on-board fault diagnostic facility.

In a further embodiment, in which the unit further comprises an input port for receiving a signal indicative of a measured rotational speed of the turbocharger, the microprocessor is further adapted to compare the estimated rotational speed of the turbocharger with the measured rotational speed of the turbocharger and to adjust the estimated rotational speed of the turbocharger based on the signal indicative of the measured rotational speed of the turbocharger. In this embodiment, a physical sensor is used to further improve the estimation of the rotational speed of the turbocharger.

The estimated rotational speed of the turbocharger according to one of the above-embodiments may also be used to provide over-speed protection for the turbocharger and/or to control the engine so as to increase performance and/or efficiency of the combustion process. An engine control unit for controlling the rotational speed of an exhaust-driven turbocharger of an internal combustion engine is also provided that comprises the unit according to one of the above-embodiments. The microprocessor is further adapted to compare the estimated rotational speed of the turbocharger with a maximum allowable rotational speed and to output a signal for controlling at least one of a swallowing capacity or an efficiency of the turbocharger to adjust the rotational speed of the turbocharger.

A system is also provided that comprises a turbocharger having a compressor defining a compressor outlet fluidly coupled to an intake manifold of an internal combustion engine and a compressor inlet and a turbine defining a turbine inlet fluidly coupled to an exhaust manifold of the engine and a turbine outlet, a plurality of sensors in sensor locations and a microprocessor adapted to calculate an estimated rotational speed of the turbocharger using a turbocharger model, based on the signals of the sensors. The plurality of sensors comprises a first pressure sensor in a first sensor location producing a first pressure signal indicative of pressure upstream of the compressor inlet, a second pressure sensor in a second sensor location producing a second pressure signal indicative of pressure downstream of the compressor outlet, a first temperature sensor in the first sensor location producing a first temperature signal indicative of the temperature upstream of the compressor inlet, a third pressure sensor in a third sensor location producing a third pressure signal indicative of pressure upstream of the turbine inlet, a fourth pressure sensor in a fourth sensor location producing a fourth pressure signal indicative of pressure downstream of the turbine outlet, and a second temperature sensor in the third sensor location producing a second temperature signal indicative of the temperature upstream of the turbine inlet.

This system may be used to control the rotational speed of the turbocharger to increase combustion efficiency of the engine and/or to provide over-speed protection for the turbocharger. The system may also be used to check the calibration of a physical turbocharger speed sensor.

If the system is to control the rotational speed of the turbocharger, the system may further comprise a control mechanism for controlling at least one of a swallowing capacity and efficiency of the turbocharger. The microprocessor is further adapted to compare the estimated rotational speed of the turbocharger with a maximum allowable rotational speed and to control the control mechanism to adjust the rotational speed of the turbocharger.

The swallowing capacity and/or efficiency of the turbine may be adjusted in order to affects the engine operating conditions, for example compressor outlet pressure, turbocharger rotational speed and/or exhaust pressure.

The control mechanism may adjust the rotational speed of the turbocharger in different ways. In an embodiment, the control mechanism comprises a turbine configured as a variable geometry turbine. The variable geometry turbine is responsive to a control signal produced by the microprocessor to modify the swallowing capacity of the turbine in a manner that adjusts the rotational speed of the shaft of the turbocharger.

In a further embodiment, the control mechanism comprises a wastegate fluidly coupled between the exhaust gas inlet and the exhaust gas outlet of the turbine. The wastegate is responsive to a control signal produced by the microprocessor to selectively divert exhaust gas therethrough and away from the exhaust gas inlet of the turbine in a manner that adjusts the rotational speed of the shaft of the turbocharger.

In a further embodiment, the control mechanism comprises an exhaust throttle responsive to a control signal produced by the microprocessor to modify the flow rate of exhaust gas through the turbine in a manner that adjusts the rotational speed of the shaft of the turbocharger.

The system may also further comprise a sensor for measuring the rotational speed of the turbocharger. In this embodiment, the microprocessor is further adapted to compare the estimated rotational speed of the turbocharger with the measured rotational speed of the turbocharger and to adjust a validity of the sensor based on the estimated rotational speed of the turbocharger.

If the system includes a sensor for measuring the rotational speed of the turbocharger, the microprocessor may be further adapted to compare the estimated rotational speed of the turbocharger with the measured rotational speed of the turbocharger and to adjust the estimated rotational speed of the turbocharger based on a signal from the sensor. This embodiment may be used to improve the accuracy of the estimation of the rotational speed of the turbocharger based on the measured rotational speed of the turbocharger.

A vehicle comprising the system according to one of the above-embodiments is also provided. The internal combustion engine of the vehicle is coupled to a transmission to drive at least one wheel. The internal combustion engine may operate on a diesel principle and the turbocharger may be a variable geometry turbocharger or a fixed geometry turbocharger. Specific embodiments will now be described with reference to the drawings.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
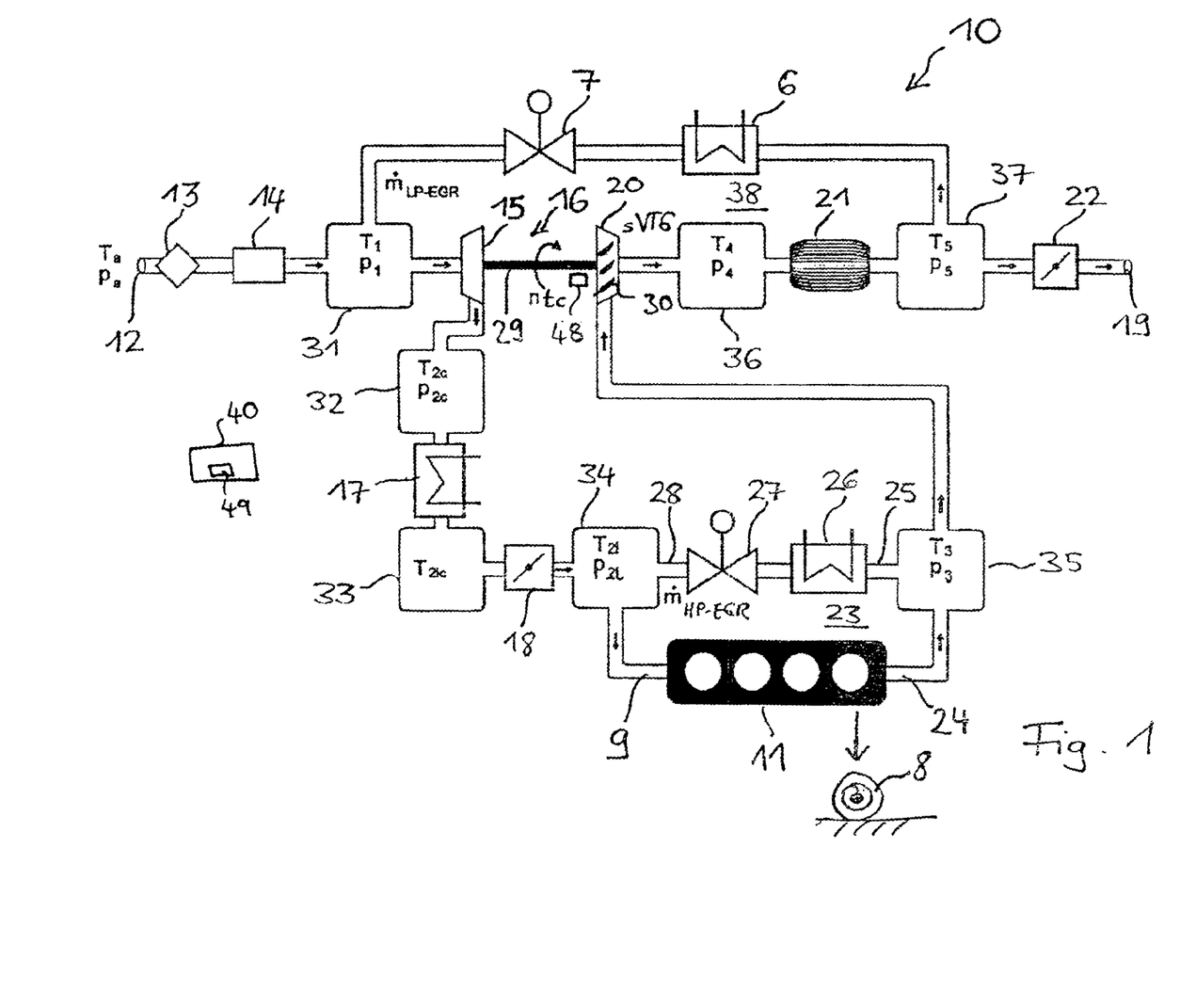
FIG. 1 illustrates an internal combustion engine with an exhaust driven turbocharger in accordance with an exemplary embodiment.

In an exemplary embodiment, FIG. 1 illustrates a system 10 for controlling the rotational speed of a turbocharger of an internal combustion engine 11.

A crankshaft of the diesel engine 11 is connected to a drivetrain that is connected to wheels 8 of a car. For simplicity, the crankshaft and drivetrain are not shown in FIG. 1. Between an air intake 12 and an air inlet 9 of the diesel engine 11, the gas flow control system 10 comprises an air filter 13, a hot film (HFM) air mass flow sensor 14, a compressor 15 of a turbocharger 16, an intake air cooler 17 and an intake air throttle 18. Between the diesel engine 11 and an exhaust outlet 19, the gas flow control system 10 comprises an exhaust turbine 20 of the turbocharger 16, a diesel particulate filter (DPF) 21 and an exhaust throttle 22.

The gas flow control system 10 comprises a high-pressure exhaust gas recirculation (HP EGR) circuit 23. Between an exhaust outlet 24 of the diesel engine 11 and the air intake 9 of the diesel engine 11, the HP-EGR circuit 23 comprises a bypass branch 25, a HP-EGR cooler 26, a HP-EGR valve 27 and a recirculation branch 28. Furthermore, a low-pressure exhaust gas recirculation (LP-EGR) circuit 38 is provided between the DPF 21 and the compressor 15. The LP-EGR circuit 38 comprises an LP-EGR cooler 6 and an LP-EGR valve 7 downstream of the LP-EGR cooler 6.

For simplicity, pipes from and to the cylinders of the diesel engine 11 are not indicated separately. Likewise, fuel lines are not shown. The exhaust turbine 20 and the compressor 15 are linked by a compressor shaft 29. The rotational speed n_tc of the compressor shaft 29 is indicated by a circular arrow in FIG. 1.

In this embodiment, the exhaust turbine has a variable geometry that is controlled by a control signal sVTG. The variable geometry of the exhaust turbine 20 is realized by adjustable turbine blades 30 that are indicated by slanted lines. Mass flow rates of the HP-EGR circuit 23 and the LP-EGR circuit 38 are indicated by corresponding symbols and the ambient input temperature and pressure upstream of the air filter 13 are indicated by symbols T_a and p_a.

Various locations of sensors in the gas flow are indicated by square symbols. The square symbol is only symbolic and does not indicate the precise shape of a gas pipe at the location of a sensor. A first sensor location 31 and corresponding temperature T_1 and pressure p_1 is positioned between the HFM air mass flow sensor 14 and the compressor 15. A second sensor location 32 and corresponding temperature T_2c and pressure p_2c is positioned between the compressor 15 and the intake air cooler 17. A third sensor location 33 and corresponding temperature T_2ic is positioned between the intake air cooler 17 and the intake air throttle 18. A fourth sensor location 34 and corresponding temperature T_2i and pressure p_2i is positioned between the intake air throttle 18 and the inlet 9 of the diesel engine 11 or, respectively, the HP-EGR valve 27. A fifth sensor location 35 and corresponding temperature T_3 and pressure p_3 is positioned between the outlet 24 of the diesel engine 11 and the HP-EGR cooler 26 or, respectively, the exhaust turbine 20. A sixth sensor location 36 and corresponding temperature T_4 and pressure p_4 are positioned between the exhaust turbine 20 and the DPF 21. A seventh sensor location 37 with corresponding temperature T_5 and pressure p_5 is positioned between the DPF 21 and the exhaust gas throttle 22. A H2S catalyst and an exhaust silencer are arranged downstream of the exhaust throttle 22, but are not illustrated in FIG. 1.

The gas flow control system 10 may be realized with or without the low-pressure EGR circuit 38. Moreover, the HP-EGR circuit 23 may be provided separately for cylinders or groups of cylinders. An NOx storage catalyst (NSC) may be provided upstream of the exhaust throttle 22.

The system 10 also comprises a unit 40 for estimating the rotational speed, n_tc, of the turbocharger 16 that receives signals from the sensors 31, 32, 33, 36. The unit 40 comprises a microprocessor 49 that is suitably programmed to calculate the estimated rotational speed of the turbocharger using these signals. The connections between the unit 40 and the sensors 31, 32, 35, 36 are not illustrated in FIG. 1 for clarity.

Figure 2:
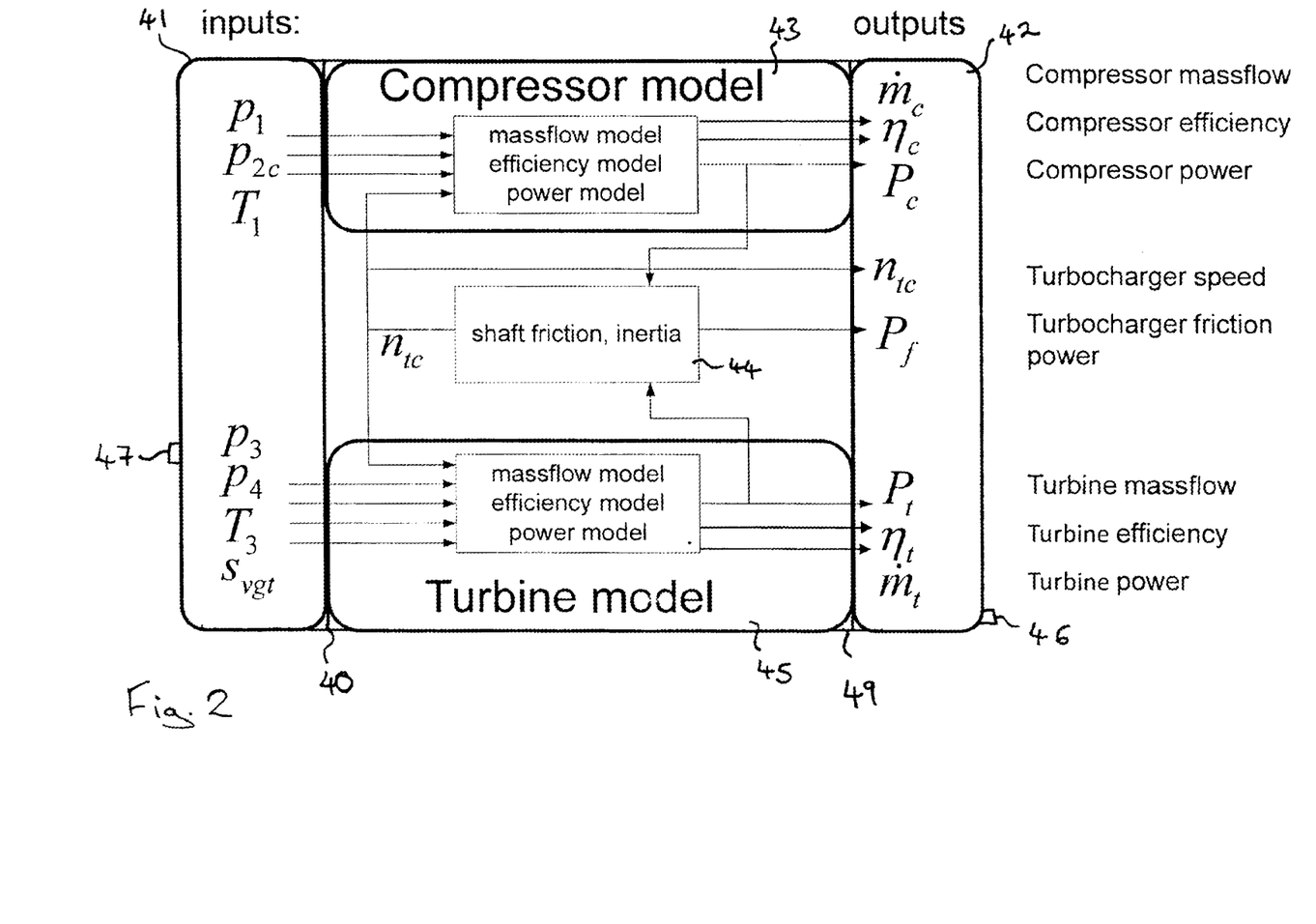
FIG. 2 illustrates a unit for estimating the rotational speed of a turbocharger in accordance with an exemplary embodiment.

FIG. 2 shows a flow diagram of a unit 40 for estimating the rotational speed, n_tc, of the turbocharger 16. The unit 40 may be used to calculate the eight estimated values P_r, P_t, d/dt(m_c), eta_c, d/dt(m_t), eta_t from the seven input values p_1, p_2c, T_1, p_3, p_4, T_3, s_vtg. The unit 40 comprises an input interface 41 with input ports is provided for receiving the input values and an output interface 42 with output ports is provided for outputting the output values. These output values may be transmitted on signals to a control unit of the turbocharger, for example. The unit 40 comprises an air compressor-modelling unit 43, a shaft transmission-modelling unit 44 and an exhaust turbine-modelling unit 45.

Input values of the air compressor unit 43 comprise the pressure p_1 and the temperature T_1 at the location 31 between the air flow meter 14 and the compressor 15 and the pressure p_2c at the location 32 between the compressor 15 and the intake cooler 17. Input values of the exhaust turbine modelling unit 45 comprise the pressure p_3 and the temperature T_3 at the location 35 between the engine outlet 24 and the exhaust turbine 20 and the pressure p_4 at the location 36 between the exhaust turbine 20 and the diesel particulate filter 21, as well as the input value s_vtg, which represents a position of the turbine blades 30.

The compressor-modelling unit 43 provides the estimated value P_c that represents a compressor output power, estimated value d/dt(m_c) which represents air mass flow through the compressor and estimated value eta_c that represents a compressor efficiency.

The turbine-modelling unit 45 provides the output value P_t, which represents the turbine input power, estimated value d/dt(m_t) which represents exhaust mass flow through the turbine, and estimated value eta_t that represents a turbine efficiency.

Input values of the shaft transmission modelling unit 44 comprise the turbine input power P_t and the compressor output power P_c. The shaft transmission unit provides the estimated value n_tc, which represents the turbine shaft revolution speed, and the estimated value P_r that represents the power loss P_r due to the transmission. Herein, "power" is to be understood as energy per time. The output of the model calculations for a given input may be stored in precomputed lookup tables for faster access.

In a further embodiment of the compressor-modelling unit 43, the energy conversion rate P_c at the compressor 15 is computed on basis of the pressures p_1, p_2c the temperature T_1, an estimated mass flow rate and an estimated isentropic efficiency at the compressor. The estimated mass flow rate is computed by a mass flow rate submodel that is based on the pressures p_1, p_2c and the estimated value n_tc using a local linear model tree LOLIMOT (LLM) approach. The estimated compressor isentropic efficiency is computed by a compressor isentropic efficiency submodel, based on the estimated mass flow rate and the estimated value n_tc of the shaft speed using an LLM approach.

More specifically, the rate P_c is modelled according to the relation $$P_c = \dot{m}_c \cdot c_{p,air} T_1^* \frac{1}{\eta_c}\left(\left(\frac{p_{2c}}{p_1}\right)^{\frac{\kappa_{air}-1}{\kappa_{air}}} - 1\right) \quad (1)$$

wherein d/dt(m_c) is the compressor mass flow rate, c_p,air the constant pressure specific heat constant of the ambient air, η_C the isentropic efficiency, T_1* a corrected temperature and κ_air an adiabatic index of the ambient air.

The compressor mass flow, the aerodynamic efficiency and the corrected temperature are modelled according to the relations $$\dot{m}_C^* = LLM\left(\frac{p_{2c}}{p_1}, n_{tc}\right)$$

$$n_C = LLM(\dot{m}_C, n_{tc}),$$

$$T_1^* = T_1 + \frac{\alpha_{c,13} A_{c,13}}{c_{p,air} \dot{m}_c}(T_3 - T_1)$$

wherein LLM stands for LLM models, $\alpha_{c,13}$ is a heat transfer coefficient, $A_{c,13}$ is the effective heat transfer area, and ΔT_13 for a temperature transfer from the turbine to the compressor which is in turn computed according to $$\Delta T_{13} = \frac{\alpha_{13}}{c_{p,air} \dot{m}_C}(T_3 - T_1).$$

Similar to the model calculations, the output of the submodel calculations for a given input may be stored in precomputed lookup tables for faster access. For higher accuracy, an effective temperature T_1* may be estimated from the temperature difference T_3–T_1 using a heat transfer submodel. The use of an LLM approach has the advantage of providing an approximate modelling of nonlinear relationships by using faster computable linear functions. Moreover, it simplifies an optimization procedure in which model parameters are adjusted. The LLM approach may even allow the online adjustment of parameters. Instead of an LLM approach each other nonlinear static modelling approach may be applied.

In a further embodiment of the exhaust turbine-modelling unit 45, the energy conversion rate P_t at the exhaust turbine 20 is computed based on the pressures p_3, p_4, the temperature T_3, an estimated mass flow rate and an estimated aerodynamic efficiency at the exhaust turbine. The estimated aerodynamical efficiency is computed by an aerodynamic submodel based on a normalized blade speed and the turbine geometry control signal s_VTG using an LLM approach. In turn, the normalized blade speed is computed from the pressures p_3, p_4, the temperature T_3 and the estimated shaft speed n_tc. The estimated mass flow rate is computed by a mass flow submodel based on the pressures p_3, p_4, the temperature T_3 and an effective opening parameter μAeff. The effective opening parameter, in turn, is computed based on the turbine geometry control signal s_VGT and the estimated shaft speed n_tc using an LLM approach. For higher accuracy, a corrected temperature T_3* may estimate from the temperature difference T_3- and T_1 using a heat transfer submodel.

More specifically, the rate P_t is modelled by the relation $$P_t = \dot{m}_t c_{p,exh} \eta_t T_3^* \left(1 - \left(\frac{p_4}{p_3}\right)^{\frac{\kappa_{exh}-1}{\kappa_{exh}}}\right) \quad (2)$$

wherein d/dt(m_T) is the turbine mass flow rate, c_P,e the constant pressure specific heat constant of the exhaust gas, η_t, the isentropic efficiency of the turbine, T_3* a corrected temperature and κ_exh an adiabatic index of the exhaust gas.

The aerodynamical efficiency, the mass flow and the corrected temperature are modelled according to the following three relations:

$$\eta_{t,aero} = LLM(c_u, s_{vtg}),$$

$$\dot{m}_t^* = \mu \, A_{eff} \frac{p_3}{\sqrt{RT_3}} \sqrt{\frac{2\kappa_{exh}}{\kappa_{exh}-1}\left[\left(\frac{p_4}{p_3}\right)^{\frac{2}{\kappa_{exh}}} - \left(\frac{p_4}{p_3}\right)^{\frac{\kappa_{exh}+1}{\kappa_{exh}}}\right]}$$

$$T_3^* = T_3 - \Delta T_{31},$$

wherein LLM stands for an LLM model, c_u is a normalized blade speed, μ a constant, A_eff an effective opening and ΔT_31 a temperature difference due to the heat loss of the turbine.

In turn, the normalized blade speed, the effective opening and the temperature difference are modelled according to the relations $$c_u = \frac{\pi D n_{tc}}{\sqrt{2c_{p,exh}T_3^*\left(1 - \frac{p_4}{p_3}\right)^{\frac{\kappa_{exh}-1}{\kappa_{exh}}}}}$$

$$\mu A_{eff} = LLM_{m,t}(s_{vgt}, p_4)$$

and $$\Delta T_{31} = \frac{\alpha_{13}}{c_{p,exh}\dot{m}_t}(T_3 - T_1).$$

For an exact modelling, the power balance equation P_c=P_t−P_r would hold, but due to measurement, modelling and computation inaccuracies, a modelling error $e_{power} = P_t - P_c - P_r$ exists.

Likewise, there is a modelling error $e_{n,tc} = n_{tc,measured} - n_{tc,model}$ for the estimated shaft speed. During a calibration procedure according to the application, parameters of the turbine-modelling unit are adjusted such that the modelling errors are minimized.

The dynamical behaviour of the turbocharger and the rotational speed of the turbocharger can be estimated using the values of P_t, P_c, P_r calculated above in conjunction with the inertia of the turbocharger shaft, compressor and turbine wheels J_tc. In one embodiment, the estimated rotational speed of the turbocharger is calculated using the following relationship:

$$\dot{n}_{tc} = \left(\frac{1}{2\pi}\right)^2 \cdot \frac{P_c - P_c - P_r}{n_{tc} \cdot J_{cc}}$$

The estimated rotational speed of the turbocharger N_tc may also be used in conjunction with a friction constant Kr to calculate the friction power P_r using the following relationship:

$$P_r = (2\pi)^2 \cdot K_R \cdot n_{tc}^2$$

As is illustrated in FIG. 2, the unit 40 comprises a turbine-modelling unit 45 and a compressor-modelling unit 43. In both units, values of the shaft friction and shaft inertia of the turbocharger shaft calculated by the shaft modelling unit 44 can be used to calculate the turbine power P_t and compressor power P_c, respectively. The calculated turbine power P_t calculated by the turbine modelling unit 45 and the calculated compressor power P_c can be used by the shaft-modelling unit 44 to calculate the estimated rotational speed n_tc of the turbocharger. The turbine modelling unit 45, Compressor modelling unit 43 and shaft modelling unit 44 may be provided by a suitably programmed microprocessor 49 or several suitable programmed microprocessors.

During operation of the diesel engine 11, the input values p_1, p_2c, T_1, p_3, p_4, T_3 are measured by sensors at the sensor locations 31, 32, 35 and 36 and are converted into electrical signals and transmitted to the input interface 41. Furthermore, the input value s_vtg of the turbine geometry is transmitted from a turbocharger control to the input interface 41.

The compressor-modelling unit 43 generates the output value P_c using a model to estimate the mass flow, a model to estimate the isentropic efficiency of the compressor and a model to estimate the energy conversion rate of the compressor 15.

The turbine-modelling unit 45 generates the output value P_t using a model to estimate the mass flow, a model to estimate the isentropic efficiency of the turbine and a model to estimate the energy conversion rate of the exhaust turbine 20. Using the output values P_c and P_t and a model for the shaft friction and the shaft inertia the shaft transmission model unit 44 generates the output values n_tc and P_r.

The input values of the turbocharger-modelling unit 40 may also be derived from measured values by the use of further models. For example, the input values p_1, T_1 may be generated as outputs of an air filter model or as an output of an air filter and an LP-EGR circuit model, if an LP-EGR circuit is present. The air filter takes the ambient pressure p_a and the ambient temperate T_a as input values. Secondly, p_2c may be obtained from an output of an intercooler and throttle pressure drop model that is based on the pressure p_2i. Thirdly, p_3, T_3 may be obtained from an output of an engine model that may in turn comprise a model for the HP-EGR circuit. The engine model uses p_2i, T_2i, q_Inj, n_eng as input values, wherein q_Inj is the amount rate of injected fuel. Fourthly, p_4 may be obtained from output values of DPF pressure drop model, which may in turn comprise a model of an LP-EGR circuit.

The value of the estimated rotational speed of the turbocharger, n_tc, may be output from the unit 40 in the form of a signal sent from an output port 46. This signal may be used to adjust the speed of the turbocharger.

In a further embodiment, the rotational speed of the turbocharger is measured by a turbocharger speed sensor 48. The measured values of the turbocharger speed may be sent using a signal to an input port 47 of the unit 40. The measured value of the turbocharger speed may be compared with the estimated values of the turbocharger speed and any difference may be used to adjust the calibration of the turbocharger speed sensor 48 or provide on-board fault diagnosis, e.g. a faulty turbocharger speed sensor.

If the rotational speed of the turbocharger is to be controlled based on the estimated rotational speed calculated by the microprocessor, this may be performed in a number of ways.

Figure 3A:
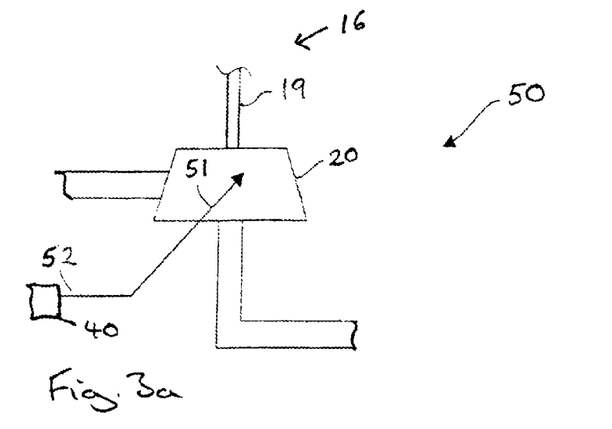
FIG. 3 illustrates alternative embodiments for control methods for controlling the speed of the turbocharger.
Figure 3B:
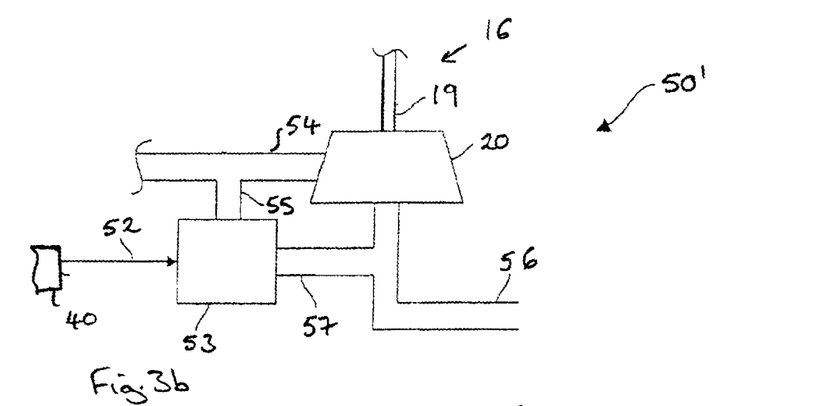
Figure 3C:
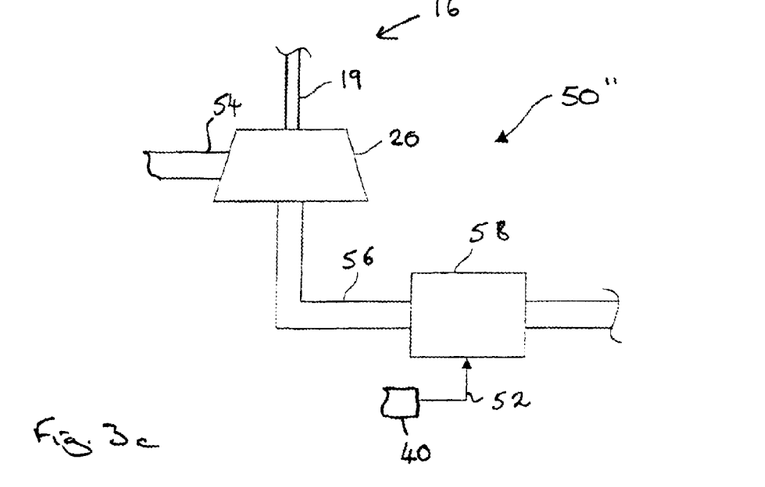

Embodiments of some turbocharger swallowing capacity or efficiency control mechanisms 50, 50', 50" are illustrated in FIGS. 3a to 3c. The control mechanisms include the unit 40 for estimating the rotational speed of the turbocharger. The unit 40 may be further adapted to comprise an output port 46 for outputting a control signal.

FIG. 3a illustrates, in an embodiment, a control mechanism 50 that may be included within system 10 to control the swallowing capacity of the turbine 20 of an electronically controllable variable geometry turbocharger 16. The turbine 20 includes a variable geometry actuator 51 electrically connected to the air handling system control output of the control unit 40 via signal path 52. In this embodiment, the control unit 40 is operable to produce a variable geometry turbocharger control signal on signal path 52, and variable geometry turbocharger actuator 51 is responsive to this control signal to control the swallowing capacity (i.e., exhaust gas flow capacity) of turbine 20 by controlling the flow geometry of turbine 20 in a known manner.

In another embodiment, FIG. 3b illustrates a control mechanism 50' that may be included within system 10 to control the efficiency of the turbine 20 is a conventional electronically controllable wastegate 53 electrically connected to the air handling system control output of the control unit 40 via signal path 52. The wastegate valve 53 has an inlet fluidly coupled to exhaust conduit 54 upstream of the inlet of the turbine 20 via conduit 55, and an outlet fluidly coupled to exhaust conduit 56 downstream of the outlet of the turbine 20 via conduit 57. In this embodiment, the control unit 40 is operable to produce a wastegate control signal on signal path 52, and the wastegate 53 is responsive to this control signal to control the position of wastegate valve 53 relative to a reference position. The position of wastegate 53 defines a cross-sectional flow area therethrough, and by controlling the cross-sectional flow area of the wastegate 53, the control unit 40 is operable to selectively modify the efficiency of the turbine 20 by diverting exhaust gas through the wastegate 53 and away from exhaust gas inlet of the turbine 20.

In another embodiment, FIG. 3c illustrates that a control mechanism 50" that may be included within system 10 to control the efficiency of the turbine 20 is a conventional exhaust throttle 58 electrically connected to the air handling system control output of the control unit 40 via signal path 52. In the illustrated embodiment, the exhaust throttle 58 is disposed in-line with exhaust conduit 56, although it will be appreciated that the exhaust throttle 58 may alternatively be disposed in-line with exhaust conduit 54. In either case, the control unit 40 is operable to produce an exhaust throttle control signal on signal path 52, and exhaust throttle 58 is responsive to this control signal to control the position of exhaust throttle 58 relative to a reference position. The position of exhaust throttle 58 defines a cross-sectional flow area therethrough, and by controlling the cross-sectional flow area of the exhaust throttle 58, control unit 40 is operable to selectively modify the efficiency of the turbine by controlling the flow rate of exhaust gas through the turbine 20.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A unit for estimating a rotational speed of a turbocharger, comprising:
    a microprocessor comprising input ports configured for receiving measurement signals from an exhaust gas flow control system of an internal combustion engine and an output port for outputting a signal indicative of the rotational speed of the turbocharger, the input ports being adapted to receive a first set of measurement signals and a second set of measurement signals, the second set of measurement signals being indicative of
        a pressure upstream of the turbine of the turbocharger,
        a pressure downstream of the turbine of the turbocharger, and
        a temperature upstream of the turbine of the turbocharger; and
    the microprocessor being configured to calculate an estimated rotational speed of the turbocharger using a turbocharger model, based on the first set of measurement signals and the second set of measurement signals, the second set of measurement signals comprising signals indicative of a pressure difference across a turbine of the turbocharger.

2. The unit according to claim 1, wherein the first set of measurement signals are indicative of:
    a pressure upstream of a compressor of the turbocharger,
    a pressure downstream of the compressor of the turbocharger, and
    a temperature upstream of the compressor of the turbocharger.

3. The unit according to claim 1, wherein the first set of measurement signals is used to calculate an estimated compressor power, an estimated air mass flow through a compressor and an estimated compressor efficiency.

4. The unit according to claim 3, wherein the second set of measurement signals is used to calculate an estimated turbine power, an estimated exhaust mass flow through the turbine and an estimated turbine efficiency.

5. The unit according to claim 4, wherein the estimated compressor power and the estimated turbine power are used to calculate the estimated rotational speed of the turbocharger.

6. The unit according to claim 5, further comprising an input port for receiving a signal indicative of a measured rotational speed of the turbocharger, wherein the microprocessor is further configured to compare the estimated rotational speed of the turbocharger with the measured rotational speed of the turbocharger and to adjust the estimated rotational speed of the turbocharger based on the signal indicative of the measured rotational speed of the turbocharger.

7. An engine control unit for controlling a rotational speed of an exhaust-driven turbocharger of an internal combustion engine, the engine control unit comprising:
    a microprocessor comprising input ports configured for receiving measurement signals from an exhaust gas flow control system of the internal combustion engine and an output port for outputting a signal indicative of the rotational speed of the exhaust-driven turbocharger, the input ports being adapted to receive a first set of measurement signals and a second set of measurement signals, the second set of measurement signals being indicative of:

a pressure upstream of the turbine of the exhaust-driven turbocharger, a pressure downstream of the turbine of the exhaust-driven turbocharger, and a temperature upstream of the turbine of the exhaust-driven turbocharger; and the microprocessor being configured to calculate an estimated rotational speed of the exhaust-driven turbocharger using a turbocharger model, based on the first set of measurement signals and the second set of measurement signals, the second set of measurement signals comprising signals indicative of a pressure difference across a turbine of the exhaust-driven turbocharger, wherein the microprocessor is further configured to compare the estimated rotational speed of the exhaust-driven turbocharger with a maximum allowable rotational speed, and to output a signal for controlling at least one of a swallowing capacity or an efficiency of the exhaust-driven turbocharger to adjust the rotational speed of the exhaust-driven turbocharger.

8. The engine control unit according to claim 7, wherein the first set of measurement signals are indicative of:

a pressure upstream of a compressor of the exhaust-driven turbocharger, a pressure downstream of the compressor of the exhaust-driven turbocharger, and a temperature upstream of the compressor of the exhaust-driven turbocharger.

9. The engine control unit according to claim 7, wherein the first set of measurement signals is used to calculate an estimated compressor power, an estimated air mass flow through a compressor and an estimated compressor efficiency.

10. The engine control unit according to claim 9, wherein the second set of measurement signals is used to calculate an estimated turbine power, an estimated exhaust mass flow through the turbine and an estimated turbine efficiency.

11. The engine control unit according to claim 10, wherein the estimated compressor power and the estimated turbine power are used to calculate the estimated rotational speed of the exhaust-driven turbocharger.

12. A system comprising:

a turbocharger having a compressor defining a compressor outlet fluidly coupled to an intake manifold of an internal combustion engine and a compressor inlet, and having a turbine defining a turbine inlet fluidly coupled to an exhaust manifold of the internal combustion engine and a turbine outlet;

a plurality of sensors located in sensor locations comprising:

a first pressure sensor in a first sensor location producing a first pressure signal indicative of pressure upstream of the compressor inlet;

a second pressure sensor in a second sensor location producing a second pressure signal indicative of pressure downstream of the compressor outlet;

a first temperature sensor in the first sensor location producing a first temperature signal indicative of a temperature upstream of the compressor inlet, a third pressure sensor in a third sensor location producing a third pressure signal indicative of pressure upstream of the turbine inlet;

a fourth pressure sensor in a fourth sensor location producing a fourth pressure signal indicative of pressure downstream of the turbine outlet;

a second temperature sensor in the third sensor location producing a second temperature signal indicative of the temperature upstream of the turbine inlet, a microprocessor adapted to calculate an estimated rotational speed of the turbocharger using a turbocharger model, based on the signals of the plurality of sensors located in the sensor locations.

13. The system according to claim 12, further comprising a control mechanism for controlling a swallowing capacity and/or efficiency of the turbocharger, wherein the microprocessor is further configured to compare the estimated rotational speed of the turbocharger with a maximum allowable rotational speed and to control the control mechanism to adjust a rotational speed of the turbocharger.

14. The system according to claim 13, wherein the control mechanism comprises the turbine configured as a variable geometry turbine, the variable geometry turbine being responsive to a control signal produced by the microprocessor to modify the swallowing capacity of the turbine in a manner that adjusts the rotational speed of a shaft of the turbocharger.

15. The system according to claim 13, wherein the control mechanism comprises a wastegate fluidly coupled between an exhaust gas inlet and an exhaust gas outlet of the turbine, the wastegate being responsive to a control signal produced by the microprocessor to selectively divert exhaust gas therethrough and away from the exhaust gas inlet of the turbine in a manner that adjusts the rotational speed of a shaft of the turbocharger.

16. The system according to claim 13, wherein the control mechanism comprises an exhaust throttle responsive to a control signal produced by the microprocessor to modify a flow rate of exhaust gas through the turbine in a manner that adjusts the rotational speed of a shaft of the turbocharger.

17. The system according to claim 12, further comprising a sensor for measuring a rotational speed of the turbocharger, wherein the microprocessor is further configured to compare the estimated rotational speed of the turbocharger with a measured rotational speed of the turbocharger and to adjust the estimated rotational speed of the turbocharger based on a signal from the sensor.

18. A vehicle comprising a system with a turbocharger having a compressor defining a compressor outlet fluidly coupled to an intake manifold of an internal combustion engine and a compressor inlet, and with a turbine defining a turbine inlet fluidly coupled to an exhaust manifold of the internal combustion engine and a turbine outlet, wherein the internal combustion engine is coupled to a transmission to drive at least one wheel, and wherein the system further comprises:

a plurality of sensors located in sensor locations comprising:

a first pressure sensor in a first sensor location producing a first pressure signal indicative of pressure upstream of the compressor inlet;

a second pressure sensor in a second sensor location producing a second pressure signal indicative of pressure downstream of the compressor outlet;

a first temperature sensor in the first sensor location producing a first temperature signal indicative of a temperature upstream of the compressor inlet, a third pressure sensor in a third sensor location producing a third pressure signal indicative of pressure upstream of the turbine inlet;

a fourth pressure sensor in a fourth sensor location producing a fourth pressure signal indicative of pressure downstream of the turbine outlet;
a second temperature sensor in the third sensor location producing a second temperature signal indicative of a temperature upstream of the turbine inlet; and
a microprocessor adapted to calculate an estimated rotational speed of the turbocharger using a turbocharger model, based on the signals of the plurality of sensors located in the sensor locations.

* * * * *